Patented Feb. 3, 1948

2,435,196

UNITED STATES PATENT OFFICE 2,435,196

CRACKING OF HYDROCARBONS WITH A BERYLLIUM PHOSPHATE CATALYST

George R. Bond, Jr., Paulsboro, N. J., and George Alexander Mills, Ridley Park, Pa., assignors to Houdry Process Corporation, Wilmington, Del., a corporation of Delaware No Drawing. Application March 2, 1946, Serial No. 651,628

5 Claims. (Cl. 196—52)

The present invention relates to the art of catalytic treatment of hydrocarbons, and has particular application to the catalytic cracking of such materials.

The term "cracking" with respect to hydrocarbons has at present attained the significance in the art of the thermal or catalytic-thermal treatment of petroleum hydrocarbons at temperatures above about 750° F. While many and varied materials have heretofore been proposed as catalysts for cracking, the principal materials in commercial use are certain types of activated clays and certain synthetic silica-alumina coprecipitated gel composites.

In the cracking of hydrocarbon fractions, whether catalysts of natural or synthetic origin are employed, there are produced liquid products which may be fractionated at desired levels to provide aviation fuels, motor fuels, distillate fuels and other liquid products utilizable as recycle or special charge stocks. Lesser quantities of gaseous by-products are not wasted, but can be recovered for advantageous uses. There is also formed in the cracking operation, however, a coky deposit which accumulates on the catalyst, reducing its activity and necessitating periodic regeneration to remove the same, which can be accomplished by burning at controlled temperature.

An important factor determining the value of a cracking catalyst is its relative tendency to produce by-product gas and coke, particularly the latter, as compared with the yield of desired liquid products such as motor fuel. As will be readily understood, the amount of coky deposit produced by a catalyst influences its practical or commercial value in that the deposit represents loss of charge to products that are not essentially recoverable, and further because the proportionate time which the catalyst is being employed in the production of desired valuable products is diminished by the length and frequency of regeneration necessitated as a result of the relative amount of coke deposited. Minimization of the relative amount of coke produced, accordingly, is highly significant and important in the economics of commercial operation.

While, as above indicated, the gaseous by-products formed in cracking can be usefully employed, and in some refinery operations substantial yields of gaseous by-products may be desired for use as charge to polymerization, alkylation or other processes, it is nevertheless advantageous to utilize cracking catalysts having an inherent tendency to selectively produce high ratios of liquid to normally gaseous products. For, even when substantial yields of the latter are required, the desired balance of gaseous to liquid products can be obtained by control of the severity of the cracking conditions while using the same catalysts that normally favor liquid yields, and without necessitating any change in the type of catalyst to be employed.

In accordance with the present invention a hydrocarbon material which is normally liquid and heavier than gasoline is catalytically treated at elevated temperature and catalytic cracking conditions in contact with a catalyst comprising a beryllium phosphate.

The catalysts employed in accordance with the invention produce under normal cracking conditions surprisingly high ratios of gasoline/gas and gasoline/coke. The gas produced, moreover, is of high specific gravity, indicative of the high content of valuable gaseous hydrocarbons including $C_3$ and $C_4$ hydrocarbons. By stepping up the severity of cracking conditions effecting higher relative production of gaseous products, the deposit of coke is still maintained at comparatively low levels, and the produced gases are yet within the favorable high specific gravity range.

The catalysts of the present invention may be produced generally by the interaction in aqueous menstruum of a compound of beryllium and a phosphate, including in the latter term hydrogen phosphates, commonly known as phosphoric acids. Advantageously the beryllium compound employed is a soluble salt such as the hydrated sulfate ($BeSO_4 \cdot 4H_2O$) or beryllium chloride. Alternatively, an insoluble compound such as the carbonate, oxide or hydroxide may be employed in dispersed form for reaction with the phosphate. Likewise, soluble phosphates are preferred such as alkali metal or ammonium phosphate as such, or the same may be formed in the reaction mixture employing for instance ortho or meta phosphoric acid and an alkaline reacting salt or base. The beryllium phosphate formed, depending upon the specific reactants employed and the concentrations, may be a precipitate or a gel.

The beryllium phosphate may be washed free or substantially free of other cations and anions if desired and is preferably dried prior to washing. In accordance with a preferred form of the invention, the beryllium phosphate is formed into pellets or other discrete pieces in any known or desired manner and the obtained pieces calcined at elevated temperature at above 500° F. For instance the washed or unwashed product may be filtered and partially dried to form a cake which can be broken up to lumps of suitable size or the same may be cast or extruded to pieces of desired size and shape with adjustment of the water content to proper advantage for the particular forming process employed, that is the wet product may be reduced in water content or water added to the dried product as required.

Although the contact material is referred to herein as beryllium phosphate for convenience, it cannot be definitely asserted that the mass comprises a combination of cation and anion or comprises a plurality of oxides. Apparently even though precipitating reactions to form the product involve stoichiometric ratios, such ratios may not be retained on calcination, in fact there are some indications that dissociation does occur at least in part at these high temperatures. The invention accordingly is not limited to any particular salt structure or composition but includes the products of interaction of the stated types of reagents, yielding products consisting essentially of combinations of beryllium, phosphorous and oxygen, which are herein referred to for expedience as beryllium phosphate.

It is within the scope of the present invention to employ contact masses in which the beryllium phosphate is deposited or precipitated in or on a suitable support or carrier, which may be inactive such as silica gel, fuller's earth, or bauxite, or a catalytically active earth or clay such as an acid-activated bentonite, or synthetic silica-alumina.

In the use of the catalysts of the present invention, the usual conditions of cracking can be availed of without modification, the catalyst being in the form of fine particles, granules, globules, pellets or the like. The described catalyst can be employed in fixed bed processes for cracking of petroleum fractions as well as in processes in which the catalyst moves through the reaction zone. As an example of a fixed bed operation, cracking may be carried out at a temperature of 800–900° F., employing a space rate (volume of charge liquid basis per volume of catalyst per hour) of about 1.5 and a pressure of about 15 pounds per square inch gauge. The temperature, of course, may be varied within the range of about 700 to 1100° F., the space rate within the range of about 0.5 to 8 and pressures may be employed from about atmospheric or slightly lower up to about 100 pounds per square inch or higher. Under these conditions the operating period "on stream" may range from five to sixty minutes, for example 10 to 30 minutes, alternating with regeneration periods. Steam may be added to the charge stock and is particularly advantageous in assisting the vaporization of heavier stocks.

In processes other than the fixed bed, such as where the catalyst moves through the reaction zone, the conditions employed may be such as to subject the oil to substantially equivalent conditions including contact time and ratios of oil to catalyst as those set out above in connection with the fixed bed process.

Whereas in the fixed bed operation the catalyst is alternately subjected to regeneration, in the other processes the catalyst is passed during its cycle through a separate regeneration zone. In all of these processes regeneration is effected by contacting the catalyst after use, with air or other oxygen-containing gas to burn off carbonaceous deposit.

Various specific embodiments are illustrated in the following examples.

*Example I*

A solution was prepared by dissolving 1.845 kilograms of beryllium sulfate ($BeSO_4.4H_2O$) in 16.8 liters of water, to which solution were added 1000 cc. of 28% aqua ammonia and 250 cc. of concentrated sulfuric acid (95%). A second solution was prepared by dissolving 1.197 kilograms of mono-ammonium phosphate $$(NH_4H_2PO_4)$$

in 16.8 liters of water, to which solution was added 3,660 cc. of 28% aqua ammonia. The second solution was poured into the first with the formation of a white gel having a pH of 8.7. The product was allowed to stand overnight, then filtered and dried in an oven at 250° F. with circulation of air through the mass. The dried gel was then washed until the wash water tested free of $SO_4$ and free of Be; at this stage the test still showed small amounts of $PO_4$. The washed gel was then spread on pans and dried at 250° F.

The dried product was cast into pellets and the pellets calcined at 1400° F. for 10 hours in the presence of 5% steam.

The catalyst so obtained was tested in cracking of a light East Texas gas oil under the following operating conditions: temperature of 800° F., atmospheric pressure, at a liquid space rate of 1.5, ten-minute on stream periods. There was obtained from the charge stock 21.5% by volume of gasoline with the production of 0.8% by weight of coke and 1.4% by weight of gas of 1.58 specific gravity.

Other catalysts similarly prepared with diammonium phosphate showed substantially similar results.

*Example II*

The catalyst of the preceding example was employed in cracking of a heavy charge stock under the following conditions: charging an East Texas crude oil fraction from which 56% had been topped and 12% of the tar bottoms removed (A. P. I. gravity 28.9) at a temperature of 900° F., atmospheric pressure and a liquid space rate of 1 with 5% by weight of steam added to the charge stock, operating at 10-minute on stream periods. There was obtained 33.4% by volume of gasoline, with 2.9% by weight of coke and 10.9% by weight of gas of 1.34 specific gravity.

*Example III*

A product containing beryllium phosphate on silica gel (89% $SiO_2$, 11% $Be_3(PO_4)_2$) was obtained as follows:

To a solution of 152 grams of trisodium phosphate ($Na_3PO_4.12H_2O$) per liter of water, was added a solution of 106.2 grams of beryllium sulfate ($BeSO_4.4H_2O$) in 300 cc. of water, with the formation of a thick white gelatinous mass. The mass was filtered and the precipitate washed to remove soluble salts until the wash water gave no precipitate with $NH_4OH$ indicating the absence of beryllium. The moist filter cake was dissolved in dilute sulfuric acid with stirring and further diluted with water to 3.4 liters. To the diluted solution there was added a solution of 264 grams of ammonium sulfate dissolved in sufficient water to make a liter; and an equal volume of diluted "N-brand" sodium silicate solution ($SiO_2$=396 grams) added to the mixed solutions with violent agitation. A milky-white product was obtained which set to a firm gel in several seconds. The gel, which had a pH of 7.60, was permitted to stand overnight, dried, and then washed with water and treated with $NH_4Cl$ solution to free the same of sodium ions.

The washed product was dried at about 220° F. and ground to a light fluffy powder. Water was added to the powder together with a small portion of previously undried gel to form a smooth paste which was cast into 4 mm. pellets, and the pellets dried at 200° F.

The pellets were calcined and tested in cracking of light East Texas gas oil under the operating conditions given in Example I. Good ratios of gasoline/coke and gasoline/gas were obtained.

Instead of the method outlined in the above example composited catalysts may also be made by dipping formed pieces of silica gel in solutions of beryllium phosphate. For instance, a catalyst may be prepared by dipping beads of silica hydrogel in a liquid prepared by reacting beryllium hydroxide and phosphoric acid ($H_3PO_4$).

Obviously many modifications and variations of the invention as hereinbefore set forth may be made without departing from the spirit and scope thereof and therefore only such limitations should be imposed as are indicated in the appended claims.

We claim as our invention:

1. The process which comprises cracking a hydrocarbon oil heavier than gasoline by subjecting the same to contact under catalytic cracking conditions with a beryllium phosphate.

2. In the catalytic production of gasoline from hydrocarbons of average boiling range higher than gasoline the process which comprises cracking the higher boiling hydrocarbons in the presence of a surface active contact body produced by the calcination of a beryllium phosphate.

3. The process of claim 1 in which the catalytic cracking conditions involve a temperature in the range 800–900° F., a liquid space rate of about 1.5 and a pressure of about 15 pounds per square inch gauge.

4. The process which comprises subjecting a hydrocarbon oil heavier than gasoline to contact with a catalyst comprising a calcined reaction product of a beryllium compound and a phosphate, the contact of oil and catalyst being carried out at a temperature in the range of 700–1100° F. at a liquid space rate of about 0.5 to 8.

5. The process which comprises cracking a hydrocarbon material by contacting it under catalytic cracking conditions with a formed contact mass comprising a beryllium phosphate produced by precipitation of a soluble beryllium salt with an ammonium phosphate, forming the reaction product into pieces, drying and calcining the formed pieces.

GEORGE R. BOND, JR.
GEORGE ALEXANDER MILLS.

REFERENCES CITED

The following references are of record in the file of this patent:

UNITED STATES PATENTS

| Number | Name | Date |
|---|---|---|
| 2,349,827 | Mattox | May 30, 1944 |

FOREIGN PATENTS

| Number | Country | Date |
|---|---|---|
| 386,669 | Great Britain | Jan. 9, 1933 |